Figure 1:
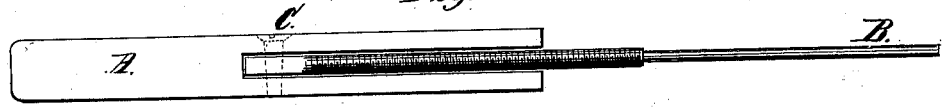
Figure 2:
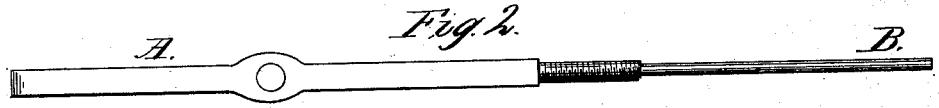
Figure 3:
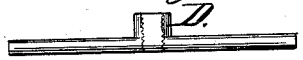
Figure 4:
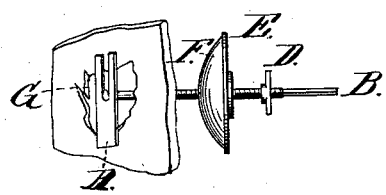

J. W. WOOD.
Leak-Stoppers.

No. 156,198. Patented Oct. 20, 1874.

Witnesses.
Fred. W. Atkinson
William Gardner

Inventor.
John William Wood.

UNITED STATES PATENT OFFICE.

JOHN WILLIAM WOOD, OF HARWICH, ENGLAND.

IMPROVEMENT IN LEAK-STOPPERS.

Specification forming part of Letters Patent No. 156,198, dated October 20, 1874; application filed May 28, 1874.

*To all whom it may concern:*

Be it known that I, JOHN WILLIAM WOOD, of Harwich, England, have invented a new and Improved Apparatus or Appliance for Stopping Holes in Ships and Boilers, and in other vessels or objects, of which the following is a specification:

The object of my invention is to stop holes in ships and boilers, and in other vessels or objects, effectually, by means of the apparatus hereinafter described.

I take a flat bar of metal, A, by preference rounded at one end, in order to make it enter more readily, and long enough to cross the hole G perpendicularly, but not too large to pass through it horizontally. I form this bar A with a slot or slit to half, or about to half, its length, by which the other half of its length is left proportionately heavier; and I make the slot of sufficient width to admit of a threaded spindle, B, somewhat longer than the whole bar A, and working in the slot; and I joint the head of the spindle B to the center of the bar A by means of a pin or bolt, C, threaded at one end, and flush with each side of the bar. I have a screw-nut, D, fitting the thread of the spindle B, with or without an arm or lever at each side, to take hold of.

The mode of using my invention is as follows: I first take hold of the inner end of the screwed spindle or bolt B, keeping it flush with the bar A, and push them horizontally forward as far as the inner end of the bar A, through the hole G, when the solid or heavy end of the bar A then drops by its own weight, thereby adjusting itself across the outside of the hole G. The surplus length of the spindle B is then drawn in. I then take the flat or dished metal plate B, of any required shape or size, to cover the hole G, and pierced at or near the center to pass freely over the spindle B. I place such plate E onto the screwed spindle or bolt B, following up with the screw-nut D, till the plate is jammed up tight and the leak stopped.

If required, I interpose an elastic packing or washer, F, between the plate E and the inner side of the hole G, or a bag filled with oakum or other yielding material, with a hole pierced through it.

These apparatus are made of various sizes to suit the purposes for which they are to be applied.

I claim as my invention—

A slotted weighted cross-bar or catch, in combination with a screw-spindle pivoted thereto, and provided with a nut, whereby a plate may be clamped in the location desired, substantially as described.

JOHN WILLIAM WOOD.

Witnesses:
 FRED. W. ATKINSON,
 WILLIAM GARDNER.